(12) United States Patent
Toya

(10) Patent No.: US 7,746,029 B2
(45) Date of Patent: Jun. 29, 2010

(54) BATTERY CHARGER WITH USB CONNECTOR AND CABLE STORAGE RECESS

(75) Inventor: Shoichi Toya, Moriguchi (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 133 days.

(21) Appl. No.: 11/896,340

(22) Filed: Aug. 31, 2007

(65) Prior Publication Data

US 2008/0174265 A1 Jul. 24, 2008

(30) Foreign Application Priority Data

Sep. 5, 2006 (JP) ............................. 2006-240087

(51) Int. Cl.
*H02J 7/00* (2006.01)
*H01R 13/58* (2006.01)

(52) U.S. Cl. ....................... 320/107; 320/110; 320/113; 439/460; D13/107

(58) Field of Classification Search ................. 320/107, 320/113, 110, 111, 112, 114, 115; D13/107; 242/170, 171
See application file for complete search history.

(56) References Cited

U.S. PATENT DOCUMENTS

| | | | | |
|---|---|---|---|---|
| 5,901,056 A | * | 5/1999 | Hung | ........................ 363/142 |
| 6,589,069 B1 | * | 7/2003 | Liao | ........................... 439/501 |
| 6,722,917 B2 | * | 4/2004 | Huang | ........................ 439/501 |
| 7,017,055 B1 | * | 3/2006 | Ho | .............................. 713/300 |
| 7,412,259 B2 | * | 8/2008 | Yoo et al. | .................... 455/557 |
| 7,425,816 B2 | * | 9/2008 | Meyer et al. | ................ 320/141 |
| 2003/0142817 A1 | * | 7/2003 | Liao | ...................... 379/428.01 |
| 2006/0170393 A1 | * | 8/2006 | Yang | .......................... 320/107 |
| 2007/0278995 A1 | * | 12/2007 | Batdorff et al. | ............. 320/107 |

FOREIGN PATENT DOCUMENTS

| | | |
|---|---|---|
| JP | 2003-40533 A | 2/2003 |
| JP | 2004-79320 A | 3/2004 |

\* cited by examiner

*Primary Examiner*—Edward Tso
*Assistant Examiner*—Richard V Muralidar
(74) *Attorney, Agent, or Firm*—Westerman, Hattori, Daniels & Adrian, LLP

(57) ABSTRACT

A battery charger has a housing with a battery containing portion in which a rechargeable battery is detachably contained, a connector attached to the end of a power cord led out from the housing, and a charging source that is installed in the housing and charges the rechargeable battery contained in the battery containing portion with power supplied through the connector, and the housing is provided in its outer circumferential wall with a gutter-like cord recess in which the power cord is stored along the outer circumferential wall, and also with a connector holder that detachably holds the connector.

9 Claims, 5 Drawing Sheets

BATTERY CHARGER WITH USB CONNECTOR AND CABLE STORAGE RECESS

BACKGROUND OF THE INVENTION

1. Field of the Invention

The present invention relates to a battery charger that is user-friendly and suitable for charging rechargeable batteries through a USB (Universal Serial Bus) of a personal computer (PC) or the like.

2. Description of the Related Art

Rechargeable batteries that can be reused by charging electrical energy, particularly cylindrical (circular) rechargeable batteries called AA-size batteries and AAA-size batteries have been used as general-purpose power sources for various kinds of devices. Chargers for these rechargeable batteries are mostly each provided with a built-in AC-DC converter formed of a transformer, a rectifier, etc. in a housing having a battery containing portion in which a rechargeable battery is detachably contained. The chargers are used, for example, in the condition where an AC plug installed in the housing is connected directly to an AC outlet.

A charger to be used while being externally connected to a device having a built-in rechargeable battery, or so-called AC adapter, has been well known. More specifically, there has been proposed a charger that is so constructed that AC and DC cords can be led out from a housing that is a main part of the charger and stored by winding them around the housing (see Unexamined Japanese Patent Publication No. 2004-79320, for example). Another proposed charger has such construction that a DC cord is led out from a housing in which an AC plug is installed (see Unexamined Japanese Patent Publication No. 2003-40533, for example).

The USB of a personal computer or the like includes a DC power line and is then capable of supplying power, albeit small electric power, to an external device connected to the USB. Therefore, if a charger using such a USB is realized, it is possible to readily charge the rechargeable batteries on the PC use environment.

SUMMARY OF THE INVENTION

The present invention has been made in view of the above-mentioned demand. It is an object of the invention to provide a battery charger that is user-friendly and suitable for charging rechargeable batteries, for example, through a USB.

In order to achieve the object, an aspect of the present invention is directed to a battery charger comprising a housing having a battery containing portion in which a rechargeable battery is detachably contained; a connector that is attached to an end of a power cord led out from the housing; and a charging source that is installed in the housing and charges a rechargeable battery contained in the battery containing portion with power supplied through the connector. The housing is provided in an outer circumferential wall with a gutter-like cord recess in which the power cord is stored along the outer circumferential wall, and also with a connector holder that detachably holds the connector.

In the battery charger thus constructed, the power cord led out from the housing having the battery containing portion is wound along and stored in the gutter-like cord recess that is formed in the outer circumferential wall of the housing. In this condition, the connector fixed to the end of the power cord is simply fitted into the connector holder. Consequently, the power cord and the connector can be neatly stored in the outer circumferential wall of the housing. If the connector is removed from the connector holder, this allows the connector to be brought away from the housing with the connector being connected to the housing through the power cord. Accordingly, the connector can be easily attached to a power supply port of a personal computer or the like.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

A battery charger according to one embodiment of the invention will be described below with reference to the attached drawings.

The battery charger is so constructed as to be connected to a USB (Universal Serial Bus) of a personal computer (PC) or the like and charge a cylindrical (circular) rechargeable battery that is called an AA-size or AAA-size battery with DC power that is supplied from the USB.

Figure 1:
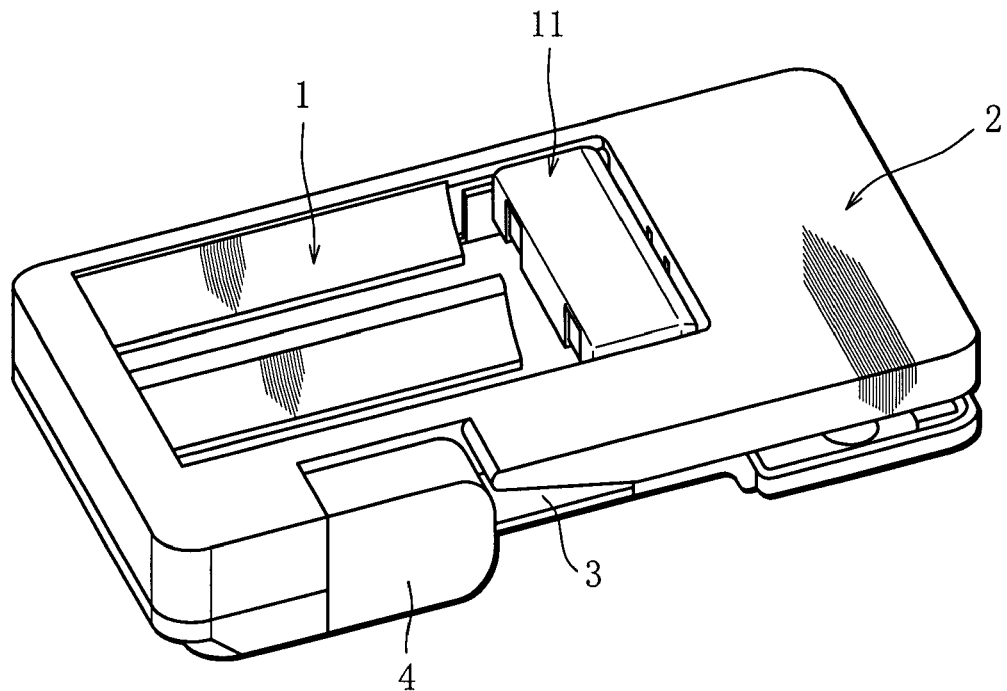
FIG. 1 is a perspective view of appearance of a battery charger according to one embodiment of the invention.
Figure 2:
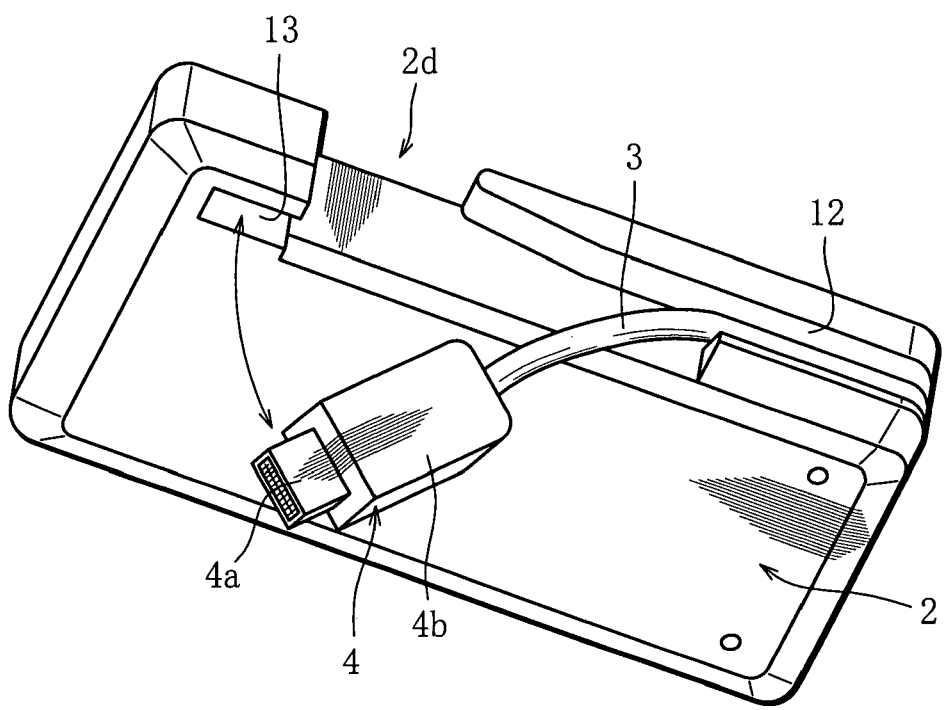
FIG. 2 is a perspective view of the battery charger shown in FIG. 1, as seen from the reverse.
Figure 3:
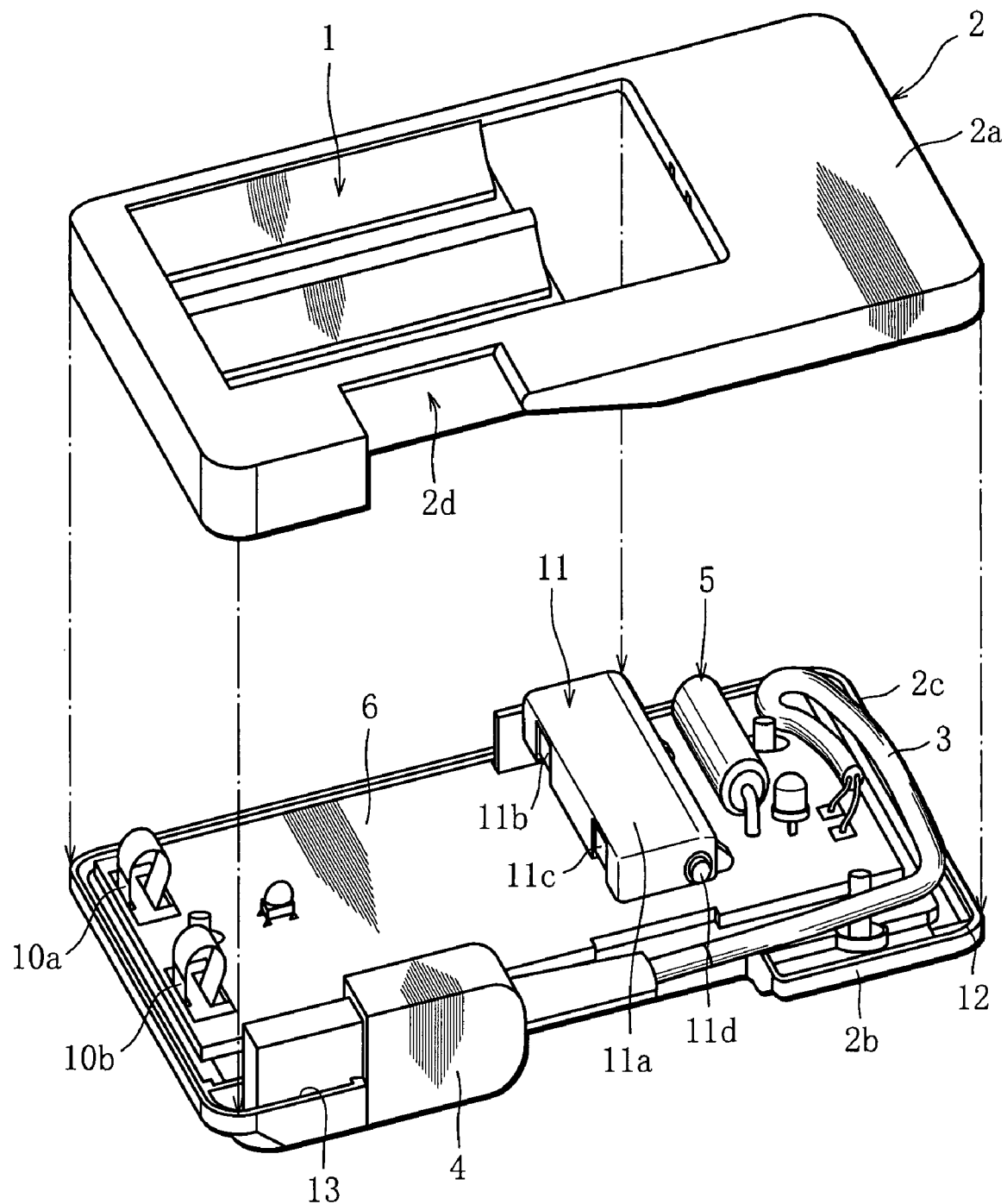
FIG. 3 is an exploded perspective view of the battery charger shown in FIG. 1.

FIG. 1 is a perspective view of appearance of the battery charger. FIG. 2 is a perspective view of the battery charger as seen from the reverse, and FIG. 3 is an exploded perspective view of the same battery charger. The battery charger roughly includes a plastic housing 2 having a battery containing portion 1 in which the rechargeable battery is detachably contained, a power cord 3 that is led out from the housing 2, a USB connector 4 that is attached to an end of the power cord 3, and a charging source 5 that is installed in the housing 2 and charges the rechargeable battery contained in the battery containing portion 1 with power that is supplied through the USB connector 4.

The housing 2 is formed of an upper case 2a and a lower case 2b both having a box-like shape. Installed in the lower case 2b is a print-circuit board 6 equipped with electric components and the like which construct the charging source 5. The upper case 2a is joined to the lower case 2b so as to cover the print-circuit board 6 and integrated with the lower case 2b. The power cord 3 is connected to the print-circuit board 6 at a first end. A second end of the power cord 3 is led out to the outside of the housing 2 through a cord outlet 2c that is formed in an outer circumferential wall of the housing 2. A USB connector 4 is attached to the second end of the power cord 3 that is led out to the outside of the housing 2.

Figure 4:
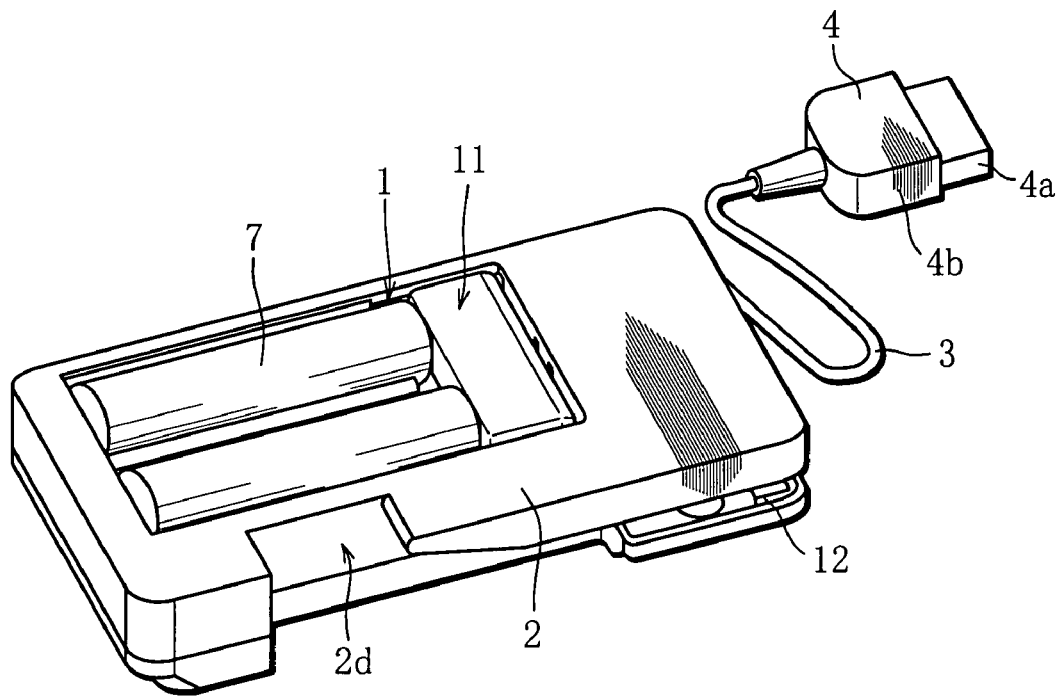
FIG. 4 is a perspective view showing a use state of the battery charger when charging AAA-size batteries.
Figure 5:
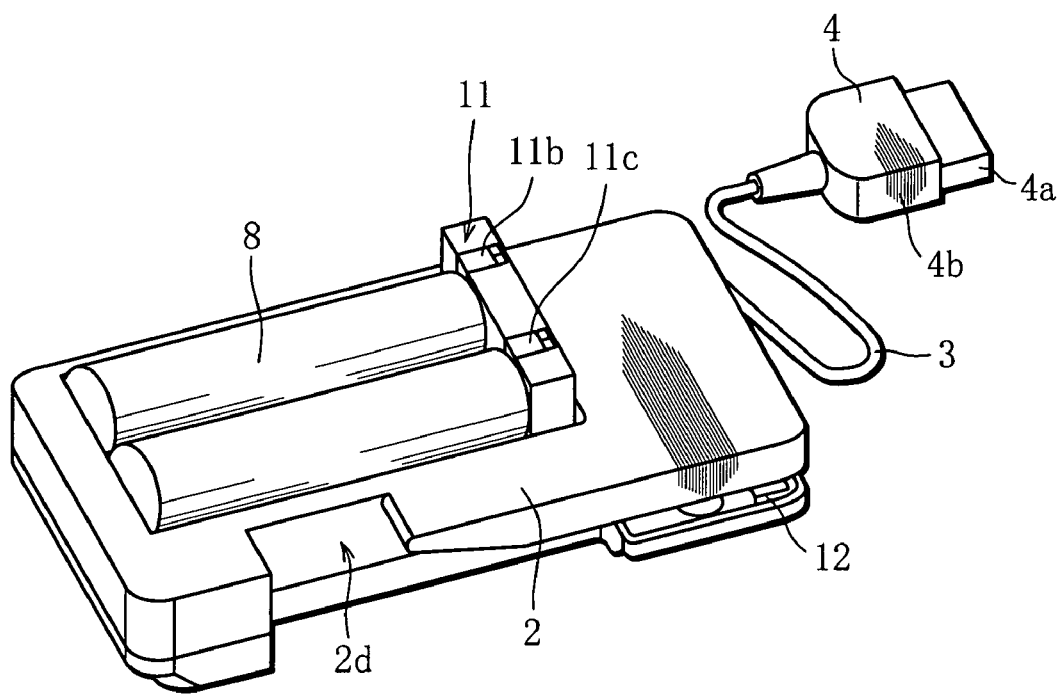
FIG. 5 is a perspective view showing a use state of the battery charger when charging AA-size batteries.

In an upper surface of the upper case 2a, there is formed a recess serving as the battery containing portion 1. As illustrated in FIGS. 4 and 5, the battery containing portion 1 is capable of detachably accommodating two AAA-size rechargeable batteries 7 or two AA-size rechargeable batteries 8 side by side. In the print-circuit board 6, two fixed terminals 10a and 10b are placed in one end portion of the print-circuit board 6 as illustrated in FIG. 3. The fixed terminals 10a and 10b are protruding from an inner wall of the battery containing portion 1 toward the rechargeable batteries 7 or 8, and are pressed against first electrodes (minus terminals) of the rechargeable batteries 7 or 8 which are accommodated in the battery containing portion 1.

In a portion of the print-circuit board 6, which is opposite to the fixed terminals 10a and 10b at a given distance, there is provided a movable terminal block 11 that is pressed against second electrodes (plus terminals) of the rechargeable batteries 7 or 8, to thereby hold the batteries 7 or 8. The movable terminal block 11 is assembled by installing two terminal boards 11b and 11c in a block body 11a having a substantially rectangular parallelepiped shape. The movable terminal block 11 is tiltably supported in a state where a shaft 11d protruding from both sides of the block body 11a is sandwiched between the upper case 2a and the lower case 2b. The terminal boards 11b and 11c are so disposed as to be exposed from an upper surface through to a lateral surface of the movable terminal block 11 when the movable terminal block 11 is in a vertically upright position. In normal time, the movable terminal block 11 is stored in the inside of the battery containing portion 1 in a horizontal position, and the terminal boards 11b and 11c are exposed in the lateral surface of the movable terminal block 11, facing the fixed terminals 10a and 10b (see FIGS. 1, 4, 5, etc.).

When the AAA-size rechargeable batteries 7 are charged by using the battery charger constructed in the above-described manner, the movable terminal block 11 is used in the horizontal position. If the AAA-size rechargeable batteries 7 are fitted in the battery containing portion 1 while the movable terminal block 11 is in the horizontal position, the rechargeable batteries 7 are contained in a position sandwiched between the fixed terminal 10a and the terminal board 11b of the movable terminal block 11, and between the fixed terminal 10b and the terminal board 11c, as illustrated in FIG. 4.

When the AA-size rechargeable batteries 8 larger than the AAA-size rechargeable batteries 7 are fitted in the battery containing portion 1, the movable terminal block 11 is used in the vertically upright position as illustrated in FIG. 5. The terminal boards 11b and 11c of the movable block 11, which are exposed in an inward surface of the movable block 11, are opposite to the fixed terminals 10a and 10b, respectively. The AA-size rechargeable batteries 8 are contained in a position interposed therebetween as illustrated in FIG. 5. In order to use the movable terminal block 11 in the horizontal or vertical upright position, the terminal boards 11b and 11c are, as described, arranged to be exposed from the upper surface through to the lateral surface of the block body 11a when the movable terminal block 11 is in the vertical upright position. Consequently, the terminal boards 11b and 11c are reliably pressed against the plus terminals of the rechargeable batteries 7 or 8. The terminal boards 11b and 11c are electrically connected to the print-circuit board 6. DC voltage is applied from the charging source 5 to between the terminal board 11b and the fixed terminal 10a, and between the terminal board 11c and the fixed terminal 10b. The rechargeable batteries 7 or 8 are thus charged, which are placed between the terminal board 11b and the fixed terminal 10a, and between the terminal board 11c and the fixed terminal 10b.

Basically, in the battery charger thus constructed, the invention is characterized by having a gutter-like cord recess 12 in which the power cord 3 that has been led out from the outer circumferential wall of the housing 2 is stored by winding the power cord 3 along the outer circumferential wall of the housing 2, and a connector holder 13 that detachably holds the USB connector 4. To be specific, the cord recess 12 is formed in a gutter-like shape along the junction of the upper case 2a and the lower case 2b so as to extend from the outer circumferential wall of the housing 2 at the longitudinal end of the housing 2, from which the power cord 3 is led out, through to the outer circumferential wall of the housing 2 at the lateral end of the housing 2. The gutter-like cord recess 12 has groove width that is set slightly smaller than a diameter of an outer covering of the power cord 3, and has groove depth that is set slightly larger than the diameter of the outer covering of the power cord 3. If the power cord 3 is pushed into the cord recess 12 taking advantage of the elasticity of the outer covering of the power cord 3, the power cord 3 is stowed in a position lightly grabbed by the cord recess 12. Needless to say, the groove width of the cord recess 12 may be set larger than the diameter of the outer covering of the power cord 3.

The connector holder 13 is formed on the outer circumferential wall of a lateral portion of the housing 2 and is disposed on an imaginary line extended from the cord recess 12 in the longitudinal direction. Especially, the connector holder 13 is formed in a portion where the USB connector 4 is located when the power cord 3 is in a state where the power cord 3 is wound around and stored in the gutter-like cord recess 12. As illustrated in FIG. 2, the connector holder 13 is a groove having a structure in which an electrode portion 4a of the USB connector 4 is interfitted from the reverse side of the housing 2. The electrode portion 4a of the USB connector 4 is constructed by providing a plurality of terminals in the inside of a metal envelope that is square in section and has an internal space with given thickness. The electrode portion 4a has appearance with a substantially rectangular parallelepiped shape. The connector holder 13 for holding the electrode portion 4a of the USB connector 4 thus constructed has an opening 13a leading to the reverse side of the housing 2 as illustrated in FIG. 2. The USB connector 4 can be mounted on and dismounted from the connector holder 13 through the opening 13a.

The USB connector 4 is held in the lateral portion of the housing 2 as illustrated in FIG. 1 by fitting the electrode portion 4a of the USB connector 4 into the connector holder 13. The USB connector 4 is specifically constructed so as to be held by the connector holder 13 with a grip portion 4b thereof positioned in a cutout 2d formed in the lateral portion of the housing 2. When the USB connector 4 is held by the connector holder 13, the grip portion 4b of the USB connector 4 mounted on the connector holder 13 can be grasped with fingertips from outside through the cutout 2d. The upper surface of the upper case 2a of the housing 2 extends to an upper portion of the connector holder 13. Therefore, the upper case 2a of the housing 2 prevents excessive upward movement of the USB connector 4.

The USB connector 4 thus mounted on the connector holder 13 is detached from the connector holder 13 by pushing the grip portion 4b of the USB connector 4 from the upper surface side of the housing 2 through the cutout 2d toward the reverse side of the housing 2. In this state, if the power cord 3 is removed from the cord recess 12, the USB connector 4 is pulled out of the housing 2 as illustrated in FIGS. 4 and 5. The USB connector 4 that has been pulled out of the housing 2 is stored in the connector holder 13 by fitting the power cord 3 into the cord recess 12 and then fitting the electrode portion 4a of the USB connector 4 into the connector holder 13 from the reverse side of the housing 2.

According to the battery charger thus constructed, the USB connector 4 is attached to the end of the power cord 3 that has been pulled out of the housing 2. This makes it possible to connect a main part of the battery charger (housing 2) to the USB through the power cord 3 simply by fitting the USB connector 4 to a USB port of the personal computer. Therefore, even when the rechargeable batteries 7 or 8 are contained in the battery containing portion 1 of the housing 2 and then virtually increase the weight of the housing 2, there is no need to support the weight of the housing 2 at a junction of the USB connector 4 and the USB port since the housing 2 and the USB connector 4 can be separated from each other in terms of weight. Consequently, undesirable mechanical stress is not applied to the USB port of the personal computer mounted with the USB connector 4. It is then possible to retain a stable connecting state of the USB connector 4 and the USB port of the personal computer, and to stably supply power from the USB toward the housing 2.

When the battery charger is not in use, the power cord 3 can be stored in the cord recess 12 formed in the outer circumferential wall of the housing 2, and the USB connector 4 can be stowed by being fitted to the connector holder 13. This offers a neat and orderly storage style. Moreover, the detachment of the USB connector 4 from the connector holder 13 can be achieved simply by pushing the grip portion 4b of the USB connector 4 to the reverse side of the housing 2. Therefore, the USB connector 4 is very easy to use, and the detachment of the USB connector 4 is not difficult, either. The attachment of the USB connector 4 to the connector holder 13 is also easy. It is consequently possible to simplify the usage of the USB connector 4 and to realize the battery charger with high usability.

Figure 6:
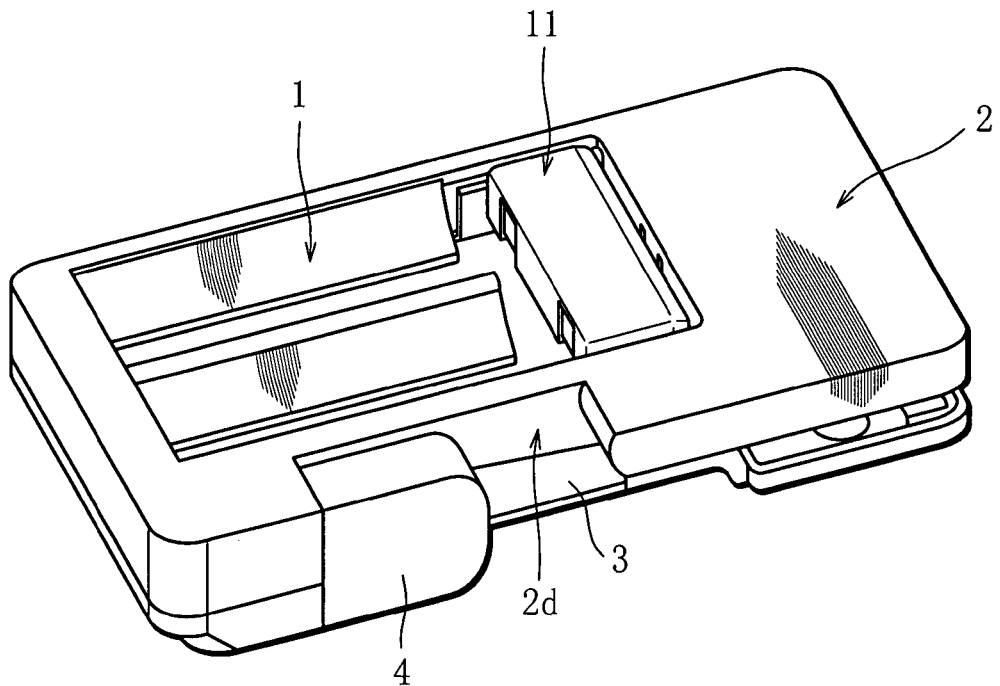
FIG. 6 is a perspective view of appearance of a battery charger according to another embodiment of the invention.
Figure 7:
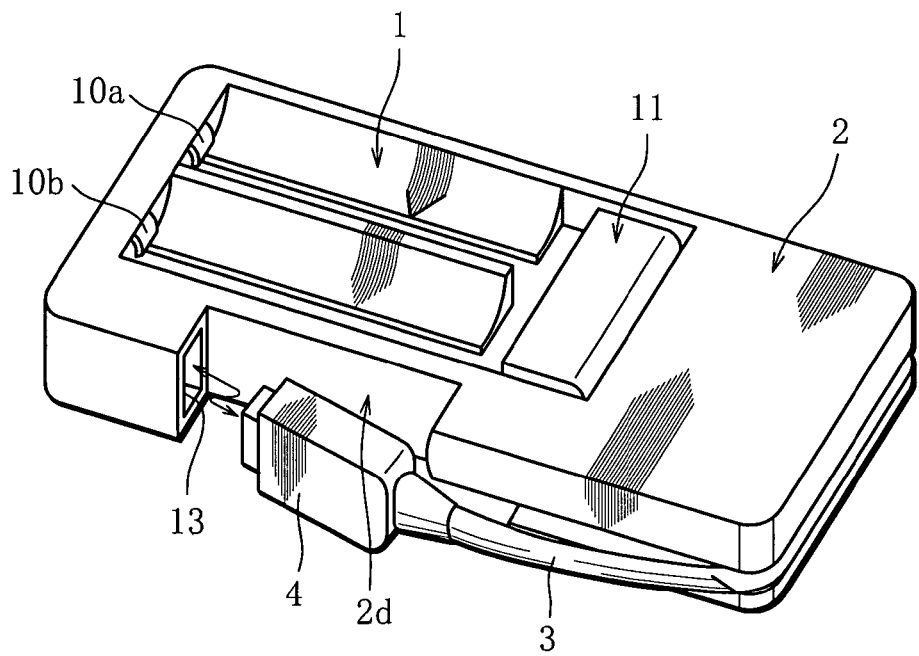
FIG. 7 is a perspective view of the battery charger shown in FIG. 6, as seen at another angle.

FIGS. 6 and 7 show another embodiment of the invention. As illustrated in FIGS. 6 and 7, a cavity may be formed along the lateral surface of the housing 2 as the connector holder 13. In this case, however, it is necessary to move the USB connector 4 back and forth along the lateral surface of the housing 2 when the USB connector 4 is attached to or detached from the connector holder 13. Therefore, the cutout 2d is formed longer along the lateral surface of the housing 2. With such a structure, the USB connector 4 is prevented without fail from undesirably falling out of the connector holder 13.

Figure 8:
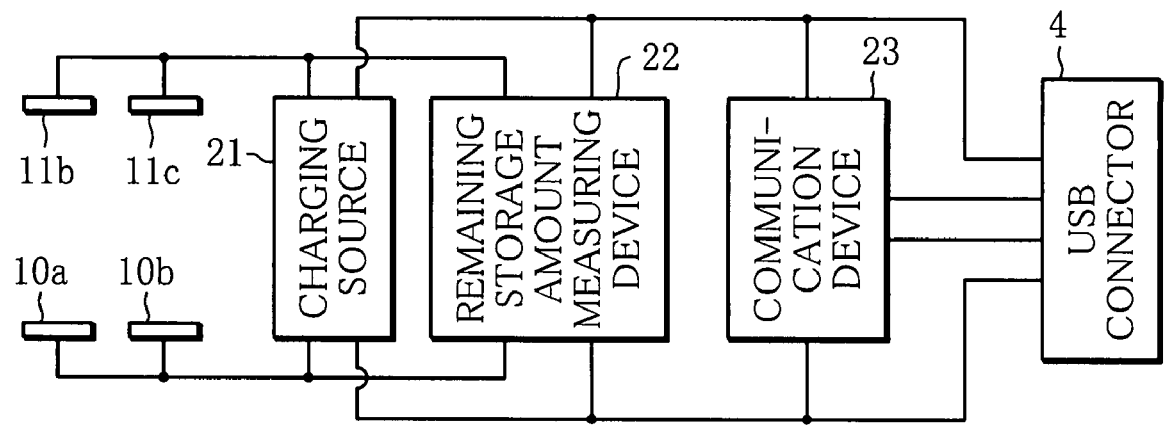
FIG. 8 is a electrical configuration diagram of the battery charger according to the invention.

FIG. 8 shows an electrical configuration of the battery charger according to the invention. As illustrated in FIG. 8, it is advantageous to install not only a charging source 21 for charging the rechargeable batteries 7 and 8 but also a remaining storage amount measuring device 22 for obtaining a storage amount of the rechargeable batteries 7 and 8, and a communication device 23 for communicating with an external device (personal computer, for example) through the USB connector 4. Preferably, information of the storage amount (remaining storage amount) of the rechargeable batteries 7 and 8, which has been obtained by the remaining storage amount measuring device 22, can be output from the communication device 23 through the USB connector 4.

Figure 9:
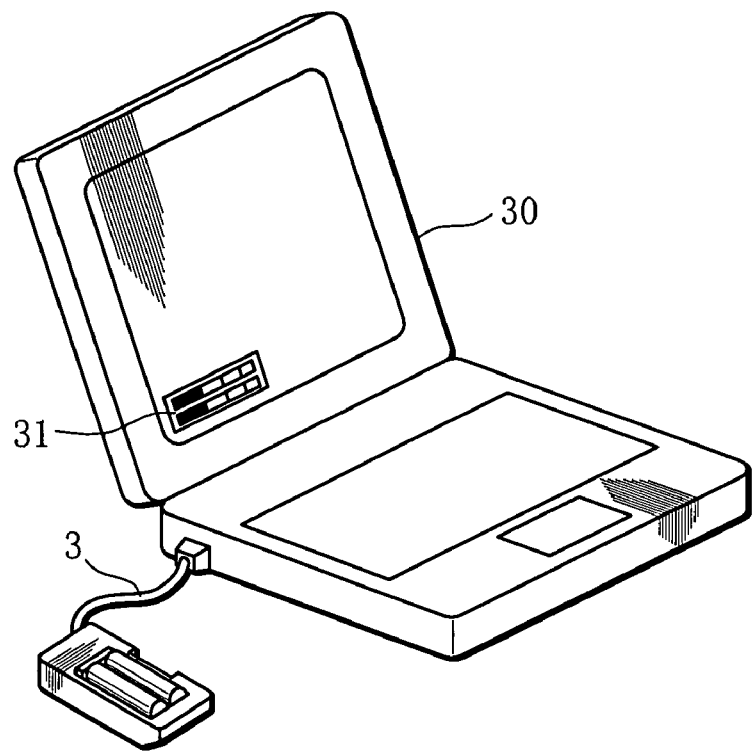
FIG. 9 is a perspective view of an example of a use state in which the battery charger according to the invention is connected to a personal computer.

If the battery charger is constructed in the above-described manner, a charging state of the rechargeable batteries 7 and 8 can be handily monitored, for example, by connecting the battery charger of the invention to a personal computer 30 as illustrated in FIG. 9, and displaying the storage amount of the rechargeable batteries 7 and 8, for example, in the form of a bar graph 31 on the screen of the personal computer 30. Especially, it is possible to monitor the charging state of the rechargeable batteries 7 and 8 without difficulty while operating the personal computer 30 as a device for supplying power to the battery charger.

The invention is not limited to the above-described embodiments. For instance, the battery charger may have a structure in which the connector holder 13 is a recessed portion whose opening is formed in the lateral surface of the housing 2, and the electrode portion 4a of the USB connector 4 is fitted into the recessed portion from the lateral surface side of the housing 2. It is also advantageous to provide elastic pieces to the inside of the connector holder 13, which holds the electrode portion 4a of the USB connector 4 by pinching the electrode portion 4a at both sides of the electrode portion 4a. If the power cord 3 is long, the gutter-like cord recess 12 may be formed over substantially the entire circumference of the outer circumferential wall of the housing 2. The invention may be carried out in various modifications without deviating from the substance of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery charger, comprising:
    a housing having a battery containing portion in which a rechargeable battery is detachably holdable;
    a connector attached to an end of a power cord led out from the housing; and
    a charging source installed in the housing which charges the rechargeable battery detachably holdable in the battery containing portion with power supplied through the connector,
    wherein an outer circumferential wall of said housing is provided with a gutter-like cord recess in which the power cord is storable along the outer circumferential wall,
    wherein the housing is provided with a connector holder to which the connector is detachably holdable,
    wherein the connector is a USB connector, and
    wherein the connector holder is formed of a groove that holds an electrode portion of the USB connector by pinching the electrode portion at sides of the electrode portion.

2. The battery charger according to claim 1, further comprising:
    a remaining storage amount measuring device installed in the housing which obtains a storage amount of the rechargeable battery detachably holdable in the battery containing portion; and
    a communication device for communicating with an external device through the USB connector,
    wherein the battery charger outputs information of the storage amount of the rechargeable battery obtained by the remaining storage amount measuring device through the communication device.

3. The battery charger according to claim 2, wherein said gutter-like cord recess is open on the outer-most side of said housing such that said power cord is storable by winding said power cord along the outer circumferential wall of said housing.

4. The battery charger according to claim 3, further comprising a fixed terminal and a movable terminal block,
    wherein said movable terminal block is movable to at least two positions, such that said fixed terminal and said movable terminal block can detachably hold at least two sizes of the rechargeable battery.

5. The battery charger according to claim 4, wherein said movable terminal block is movable to a vertically upright position and a horizontal position.

6. The battery charger according to claim 1, wherein said connector includes a grip portion that is positioned in a cutout formed in the outer circumferential wall of said housing when said connector is held by said connector holder.

7. A battery charger, comprising:
- a housing having a battery containing portion in a top portion thereof, said battery containing portion detachably containing a rechargeable battery;
- a connector attached to an end of a power cord led out from the housing; and
- a charging source installed in the housing which charges the rechargeable battery detachably holdable in the battery containing portion with power supplied through the connector,
- wherein an outer circumferential wall of said housing is provided with a gutter-like cord recess in which the power cord is storable along the outer circumferential wall;
- wherein the housing is provided with a connector holder to which the connector is detachably holdable;
- wherein the connector is a USB connector having a rectangular cross section and including a grip portion; and
- wherein when the connector is held by the connector holder, the grip portion is positioned in a cutout formed in the outer circumferential wall of the housing and a longer side of the cross section of the USB connector extends in upwards-and-downwards with respect to said housing.

8. The battery charger according to claim 7, wherein the cutout is formed in the outer circumferential wall of the housing so that upper and lower surfaces of the connector are exposed through the cutout when the connector is held by the connector holder.

9. The battery charger according to claim 8,
- wherein a cavity is provided in the circumferential wall of the housing to form the connector holder, and
- wherein the cutout formed in the outer circumferential wall of the housing is longer than the length of said connector.

* * * * *